US012525714B2

(12) United States Patent
Duan et al.

(10) Patent No.: US 12,525,714 B2
(45) Date of Patent: Jan. 13, 2026

(54) CAVITY-BACKED ANTENNA HAVING CONTROLLABLE BEAM WIDTH

(71) Applicant: HUAWEI TECHNOLOGIES CO., LTD., Shenzhen (CN)

(72) Inventors: Wen Duan, Shenzhen (CN); Weihong Xiao, Dongguan (CN); Xue Bai, Dongguan (CN); Dingjiu Daojian, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 18/314,967

(22) Filed: May 10, 2023

(65) Prior Publication Data

US 2023/0282974 A1 Sep. 7, 2023

Related U.S. Application Data

(63) Continuation of application No. PCT/CN2020/128510, filed on Nov. 13, 2020.

(51) Int. Cl.

*H01Q 3/26* (2006.01)
*H01Q 1/24* (2006.01)
*H01Q 19/10* (2006.01)

(52) U.S. Cl.

CPC ............... *H01Q 3/26* (2013.01); *H01Q 1/246* (2013.01); *H01Q 19/10* (2013.01)

(58) Field of Classification Search

CPC .......... H01Q 1/246; H01Q 3/26; H01Q 13/18; H01Q 19/10

See application file for complete search history.

(56) References Cited

U.S. PATENT DOCUMENTS 6,486,847 B1 * 11/2002 Yamamoto ............... H01Q 3/12 343/846

FOREIGN PATENT DOCUMENTS

CN 200972897 Y 11/2007
CN 106549223 B 9/2019

* cited by examiner

*Primary Examiner* — Hoang V Nguyen
(74) *Attorney, Agent, or Firm* — HAUPTMAN HAM, LLP

(57) ABSTRACT

An antenna includes a radiating element, a reflective baseplate, a metal enclosure frame, a first reflective surface, and a radiation cavity. The radiating element is on the reflective baseplate and is below the first reflective surface. The reflective baseplate is rectangular. A length of the reflective baseplate is greater than a width of the reflective baseplate. The metal enclosure frame is connected to and encircles the reflective baseplate. The metal enclosure frame includes four enclosure frame surfaces. The four enclosure frame surfaces include two first enclosure frame surfaces, and two second enclosure frame surfaces. The first enclosure frame surfaces are electrically connected to first sides of the reflective baseplate. The second enclosure frame surfaces are electrically connected to second sides of the reflective baseplate. The first sides are greater than the second sides. The first reflective surface includes a secondary reflective surface or a partially reflective surface.

20 Claims, 5 Drawing Sheets

CAVITY-BACKED ANTENNA HAVING CONTROLLABLE BEAM WIDTH

CROSS-REFERENCE TO RELATED APPLICATIONS

This application is a continuation of International Application No. PCT/CN2020/128510, filed on Nov. 13, 2020, the disclosure of which is hereby incorporated by reference in its entirety.

TECHNICAL FIELD

Embodiments of this application relate to the field of communications, and in particular, to a cavity-backed antenna having a controllable beam width.

BACKGROUND

For an antenna unit, to achieve a narrower beam and a higher gain based on a reflective baseplate, an array is generally used. However, a feeding network designed in an array of a plurality of elements is complex, and costs are high.

In some approaches, if a beam width of a single antenna unit is small, a spacing between antenna elements may be increased, a quantity of elements in antenna arrays of a same length is reduced, and a feeding network is simplified. For example, in a design of a cavity-backed antenna with a height of greater than 0.35 wavelengths and less than 0.5 wavelengths, the cavity-backed antenna may be formed by a square back cavity and a symmetric element radiation source, and an H-shaped dielectric rod above a symmetric element is configured to fasten a symmetric element and a square enclosure frame.

However, because the radiation back cavity of the antenna is of a symmetric structure, a horizontal beam width and a vertical beam width are also substantially the same. Therefore, in a 45-degree polarization state, a beam width of a horizontal plane and a beam width of a vertical plane change at the same time, making it difficult to separately control the beam width of the horizontal plane and the beam width of the vertical plane.

SUMMARY

One or more embodiments of the present application provide a cavity-backed antenna having a controllable beam width. Because a reflective baseplate is rectangular, and the reflective baseplate and a metal enclosure frame form a main radiation cavity, to be specific, the main radiation cavity of the antenna is not of a symmetric structure, a horizontal beam width is different from a vertical beam width. Therefore, a beam width of a horizontal plane and a beam width of a vertical plane may be separately controlled in a polarization state. In addition, the asymmetric main radiation cavity is divided into a plurality of secondary radiation cavities by a first reflective surface, so that an electric field can be evenly distributed, thereby improving an antenna gain.

According to a first aspect of embodiments of this application, a cavity-backed antenna having a controllable beam width is provided. The cavity-backed antenna having a controllable beam width includes a radiating element, a reflective baseplate, a metal enclosure frame, a first reflective surface, and a main radiation cavity. The radiating element is disposed on the reflective baseplate and is located below the first reflective surface. The reflective baseplate is rectangular. A reflective baseplate length of the reflective baseplate is greater than a reflective baseplate width of the reflective baseplate. In addition, the metal enclosure frame is connected to the reflective baseplate in an encircling manner, and the metal enclosure frame includes four enclosure frame surfaces. The four enclosure frame surfaces include two first enclosure frame surfaces and two second enclosure frame surfaces. The first enclosure frame surfaces are electrically connected to long sides of the reflective baseplate. The second enclosure frame surfaces are electrically connected to short sides of the reflective baseplate. Two ends of the first reflective surface are correspondingly electrically connected to the two first enclosure frame surfaces of the metal enclosure frame. The first reflective surface is a secondary reflective surface, a partially reflective surface, or a secondary reflective surface and a partially reflective surface. The reflective baseplate and the metal enclosure frame form the main radiation cavity. The main radiation cavity is divided into a plurality of secondary radiation cavities by the first reflective surface.

In some embodiments, because the reflective baseplate is rectangular, and the reflective baseplate and the metal enclosure frame form the main radiation cavity, the main radiation cavity of the antenna is not of a symmetric structure, and a horizontal beam width and a vertical beam width are different. Therefore, a beam width of a horizontal plane and a beam width of a vertical plane may be separately controlled in a polarization state. In addition, the asymmetric main radiation cavity is divided into the plurality of secondary radiation cavities by the first reflective surface, so that an electric field can be evenly distributed, thereby improving an antenna gain.

In some embodiments, a distance between a center point of the radiating element and a center point of the reflective baseplate ranges from 0 wavelengths to 0.1 wavelengths, and the wavelength is a wavelength corresponding to a center frequency in an operating frequency band.

In some embodiments, there is an offset between the center point of the radiating element and the center point of the reflective baseplate within a specific range, so that feasibility and flexibility of this solution can be improved.

In some embodiments, a distance between the reflective baseplate and the first reflective surface ranges from 0.3 wavelengths to 0.6 wavelengths.

In some embodiments, a reflection range of the first reflective surface can be controlled through different distances between the reflective baseplate and the first reflective surface, thereby improving the flexibility of this solution.

In some embodiments, an included angle between the metal enclosure frame and the reflective baseplate ranges from 45 degrees to 90 degrees.

In some embodiments, there may be an included angle between the metal enclosure frame and the reflective baseplate. When the included angle is within the included angle range, a high gain of the antenna can be ensured, and the flexibility of this solution can be improved.

In some embodiments, the first reflective surface is the secondary reflective surface or the partially reflective surface. A reflection coefficient of the partially reflective surface ranges from 0.5 to 0.9, and a height of the metal enclosure frame ranges from 0.3 wavelengths to 0.7 wavelengths.

In some embodiments, when the first reflective surface is the secondary reflective surface or the partially reflective surface, the height range of the metal enclosure frame can ensure an improvement in the antenna gain, thereby improving the feasibility of this solution.

In some embodiments, a width of a central region of the secondary reflective surface or the partially reflective surface ranges from 0.1 wavelengths to 0.6 wavelengths. The central region is located in a region above the radiating element. An offset between the region above the radiating element and the center point of the radiating element is 0 wavelengths to 0.1 wavelengths. A connection range of electrical connection regions in which the two ends of the secondary reflective surface or the partially reflective surface are correspondingly electrically connected to the two first enclosure frame surfaces of the metal enclosure frame is greater than 0 wavelengths and less than or equal to 0.6 wavelengths.

In some embodiments, a specific shape of the secondary reflective surface is not limited. In addition, because the central region is located in the region above the radiating element, the secondary reflective surface or the partially reflective surface may divide the main radiation cavity into the plurality of secondary radiation cavities. Therefore, the flexibility of this solution can be improved while the high gain is achieved.

In some embodiments, a length of the reflective baseplate ranges from 1.2 wavelengths to 2 wavelengths, and a width of the reflective baseplate ranges from 0.4 wavelengths to 0.9 wavelengths.

In some embodiments, a beam width of the vertical plane can be controlled through different length ranges of the reflective baseplate, to independently control the beam width of the vertical plane, thereby improving the feasibility of this solution.

In some embodiments, the first reflective surface is two secondary reflective surfaces and a partially reflective surface. A reflection coefficient of the partially reflective surface ranges from 0.5 to 0.9. The partially reflective surface is electrically connected to each of the two secondary reflective surfaces, and the two secondary reflective surfaces are not connected.

In some embodiments, the first reflective surface divides the asymmetric main radiation cavity into three secondary radiation cavities by the first reflective surface, to increase a quantity of the secondary radiation cavities, so that the electric field is further evenly distributed, thereby improving the antenna gain.

In some embodiments, a height of the metal enclosure frame ranges from 0.3 wavelengths to 0.7 wavelengths.

In some embodiments, a connection range of electrical connection regions in which the partially reflective surface is electrically connected to the two first enclosure frame surfaces of the metal enclosure frame is 0 wavelengths to 0.7 wavelengths, and a connection range of electrical connection regions in which the secondary reflective surface is electrically connected to the two first enclosure frame surfaces of the metal enclosure frame is greater than 0 wavelengths and less than or equal to 0.25 wavelengths.

In some embodiments, when the first reflective surface is the two secondary reflective surfaces and the partially reflective surface, size ranges respectively corresponding to the secondary reflective surface and the partially reflective surface are specifically limited, to ensure an improvement in the antenna gain and improve the feasibility of this solution.

In some embodiments, a length of the reflective baseplate ranges from 1.5 wavelengths to 2 wavelengths, and a width of the reflective baseplate ranges from 0.4 wavelengths to 0.9 wavelengths.

In some embodiments, because the main radiation cavity of the antenna is not of a symmetric structure, the horizontal beam width is different from the vertical beam width. Therefore, the beam width of the horizontal plane and the beam width of the vertical plane can be separately controlled in the polarization state.

According to the technical solutions provided in one or more embodiments of the present application, because the main radiation cavity of the antenna is not of a symmetric structure, the horizontal beam width is different from the vertical beam width. Therefore, the beam width of the horizontal plane and the beam width of the vertical plane can be separately controlled in the polarization state. In addition, the asymmetric main radiation cavity is divided into the plurality of secondary radiation cavities by the first reflective surface, so that the electric field can be evenly distributed, thereby improving the antenna gain. In addition, a single antenna unit can implement beam widths of horizontal and vertical planes of a plurality of antenna units of some approaches, thereby simplifying a feeding network in an array and reducing costs of the array.

DETAILED DESCRIPTION

The following clearly describes the technical solutions in some embodiments of this application with reference to the accompanying drawings in some embodiments of this application. It is clear that the described embodiments are merely some but not all of the embodiments of this application.

In the specification, claims, and accompanying drawings of this application, the terms “first”, “second”, “third”, “fourth”, and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms “include” and “have” and any other variants are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
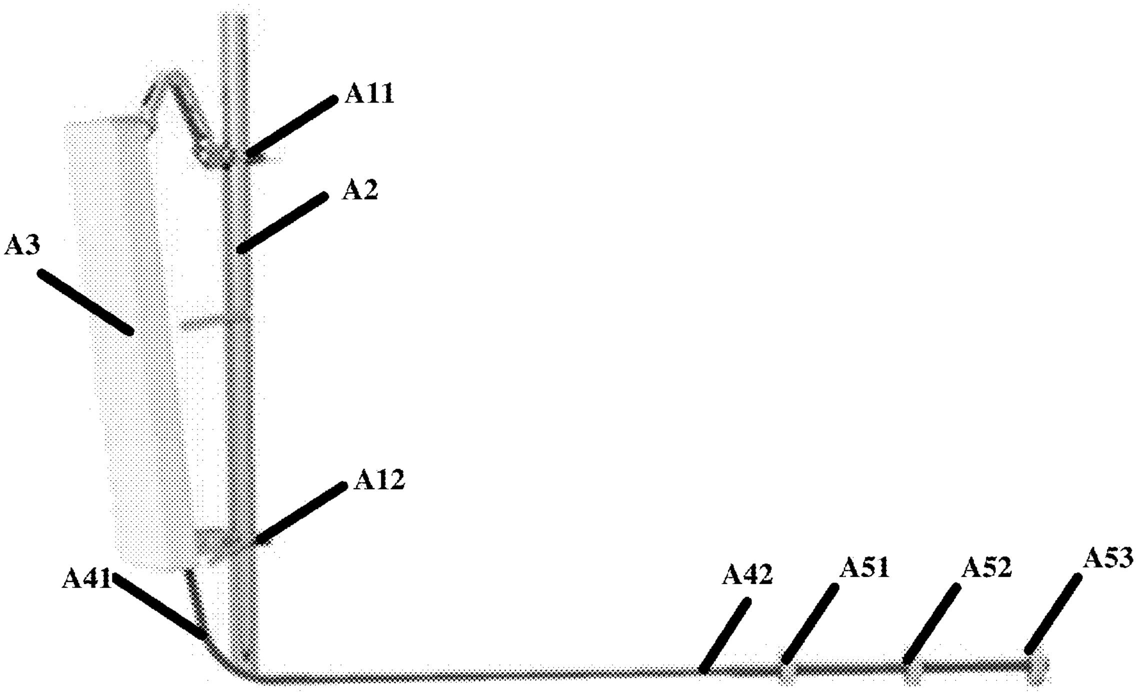
FIG. 1 is a schematic diagram of a system architecture of a base station antenna system according to an embodiment of this application.

To better understand a cavity-backed antenna having a controllable beam width disclosed in embodiments of this application, the following first describes a system architecture of a base station antenna system used in embodiments of the present disclosure. The base station antenna system generally includes a base station antenna, a base station feeder, a pole, an antenna adjustment support, and the like. For more specific understanding of the base station antenna system used in embodiments of the present disclosure, refer to FIG. 1. FIG. 1 is a schematic diagram of a system architecture of a base station antenna system according to an embodiment of this application. As shown in the figure, A11 and A12 indicate antenna adjustment supports, A2 indicates a pole, A3 indicates an antenna, A41 and A42 indicate connector sealing pieces, and A51, A52, and A53 indicate grounding apparatuses. Therefore, the antenna adjustment supports, the pole, the antenna, the connector sealing pieces, and the grounding apparatuses may form the base station antenna system. The connector sealing piece may be an insulation sealing tape or a PVC insulation tape. This is not specifically limited in this embodiment of this application.

Figure 2:
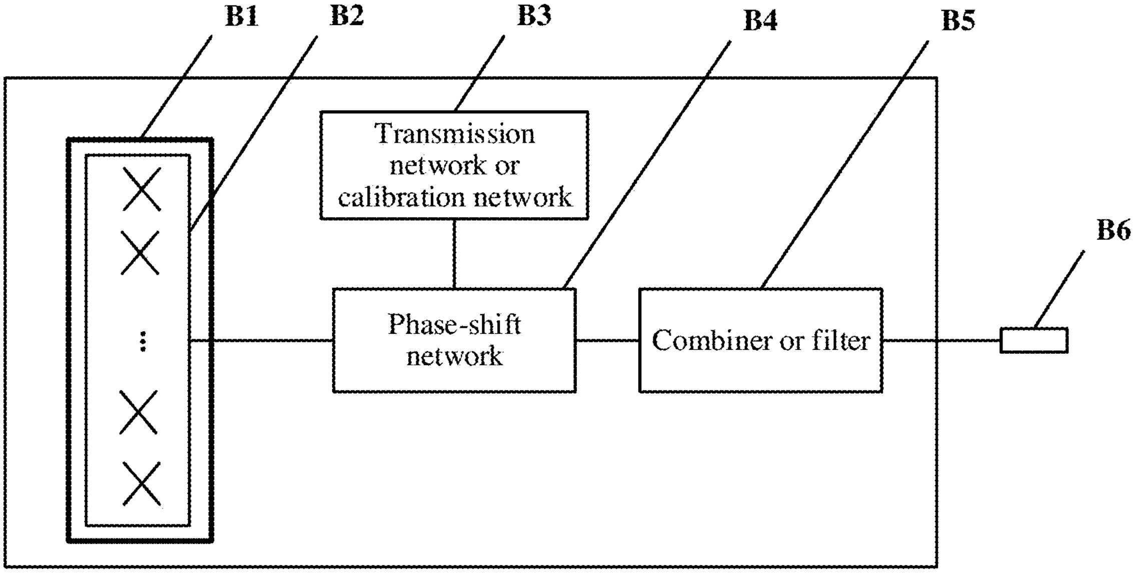
FIG. 2 is a schematic diagram of an architecture of a base station antenna according to an embodiment of this application.

To facilitate specific understanding of an architecture of the antenna in the base station antenna system, refer to FIG. 2. FIG. 2 is a schematic diagram of an architecture of a base station antenna according to an embodiment of this application. As shown in the figure, B1 indicates a radiating element, B2 indicates a reflection panel, B3 indicates a transmission network or a calibration network, B4 indicates a phase-shift network, B5 indicates a combiner or a filter, and B6 indicates an antenna connector. Therefore, the base station antenna includes at least one independent array formed by the radiating element B1 and the reflection panel B2, where a frequency of the radiating element B1 may be the same or different. This is not specifically limited herein. In addition, the radiating element B1 is generally placed above the reflection panel B2, and then the array formed by the radiating element B1 and the reflection panel B2 receives or transmits a radio frequency signal through a feeding network corresponding to the array. In addition, the feeding network may implement different radiation beam pointing directions through the transmission network B3, or may be connected to the calibration network B3 to obtain a calibration signal required by the system. Further, the feeding network includes the phase-shift network B4, and may further include a module for performance expansion, such as the combiner or the filter B5, and the base station antenna is located in a radome.

For ease of understanding, some terms or concepts in embodiments of this application are explained herein.

1. Radiating Element

The radiating element may also be referred to as an antenna element, an element, or the like. The radiating element is a unit that forms a basic structure of an antenna array, and the radiating element can effectively radiate or receive a radio wave.

2. Reflection Panel (Including a Reflective Baseplate, a Metal Enclosure Frame, and a First Reflective Surface Mentioned in Embodiments of this Application)

The reflection panel may also be referred to as a baseplate, an antenna panel, a metal reflective surface, or the like. The reflection panel is configured to improve receiver sensitivity for an antenna signal, and reflect and aggregate the antenna signal onto a receiving point, thereby enhancing receiving and transmitting capabilities of the antenna. In addition, the reflection panel blocks and shields interference of other electric waves from a rear direction (a reverse direction) on signal reception.

3. Feeding Network

The feeding network feeds a signal to the radiating element according to an amplitude and a phase, or sends a received radio signal to a signal processing unit of the base station according to an amplitude and a phase. The feeding network generally includes a controlled impedance transmission line. In addition, the feeding network may include a phase shifter. In some cases, the feeding network may further include components such as a combiner and a filter.

4. Radome

The radome is a mechanical part configured to protect the antenna system from an external environment. The radome has good electromagnetic wave penetrability in terms of electrical performance and can withstand the adverse external environment in terms of mechanical performance.

Currently, a lens antenna, a resonant cavity antenna, a reflective array antenna, and a backfire antenna are all narrow-beam high-gain units. The lens antenna converts a spherical wave in a propagation direction of the antenna into a plane wave by loading a medium with a low dielectric constant into a region one wavelength or more above the antenna, to improve a gain. The resonant cavity antenna loads a partially reflective surface at a position half a wavelength above an antenna baseplate. An electromagnetic wave is reflected a plurality of times between the partially reflective surface and the antenna baseplate, and finally radiates out in an equal phase, thereby improving the gain. A basic structure of the reflective array antenna is a single-screen or multi-screen periodic array formed by a large quantity of passive resonant units, and then a feed illuminates the array. A scattering phase of each unit on a dielectric plate for an incident wave is adjusted, so that a reflected wave is in a same phase in a specific direction, and a pencil beam with extremely strong directionality is emitted. The lens antenna, the resonant cavity antenna, and the reflective array antenna are large in size, large in height, and difficult to process. In addition, a metal plate of a size equal to or even slightly larger than a diameter of an element is placed at the position half a wavelength above the antenna baseplate of the backfire antenna to function as a secondary reflection panel of the antenna. The baseplate is surrounded by a circle of metal baffle plates with a height of half a wavelength. A part of the electromagnetic wave is diffracted out from the periphery of the secondary reflection panel, a part of the electromagnetic wave is reflected back and then reflected out from the baseplate, and a part of the electromagnetic wave is reflected back to the baseplate and then reflected out from a side baffle plate. Finally, all the transmitted electromagnetic waves are superimposed in the same phase to achieve gain improvement, thereby achieving a moderate height, a high gain, and a low side lobe, and lowering processing difficulty. In the foregoing narrow-beam high-gain unit, a beam width of the horizontal plane and a beam width of the vertical plane change at the same time in a 45-degree polarization state, making it difficult to separately control the beam width of the horizontal plane and the beam width of the vertical plane.

To resolve the foregoing problem, an embodiment of this application provides a cavity-backed antenna having a controllable beam width, to separately control a beam width of a horizontal plane and a beam width of a vertical plane in a polarization state, and improve an antenna gain.

Figure 3:
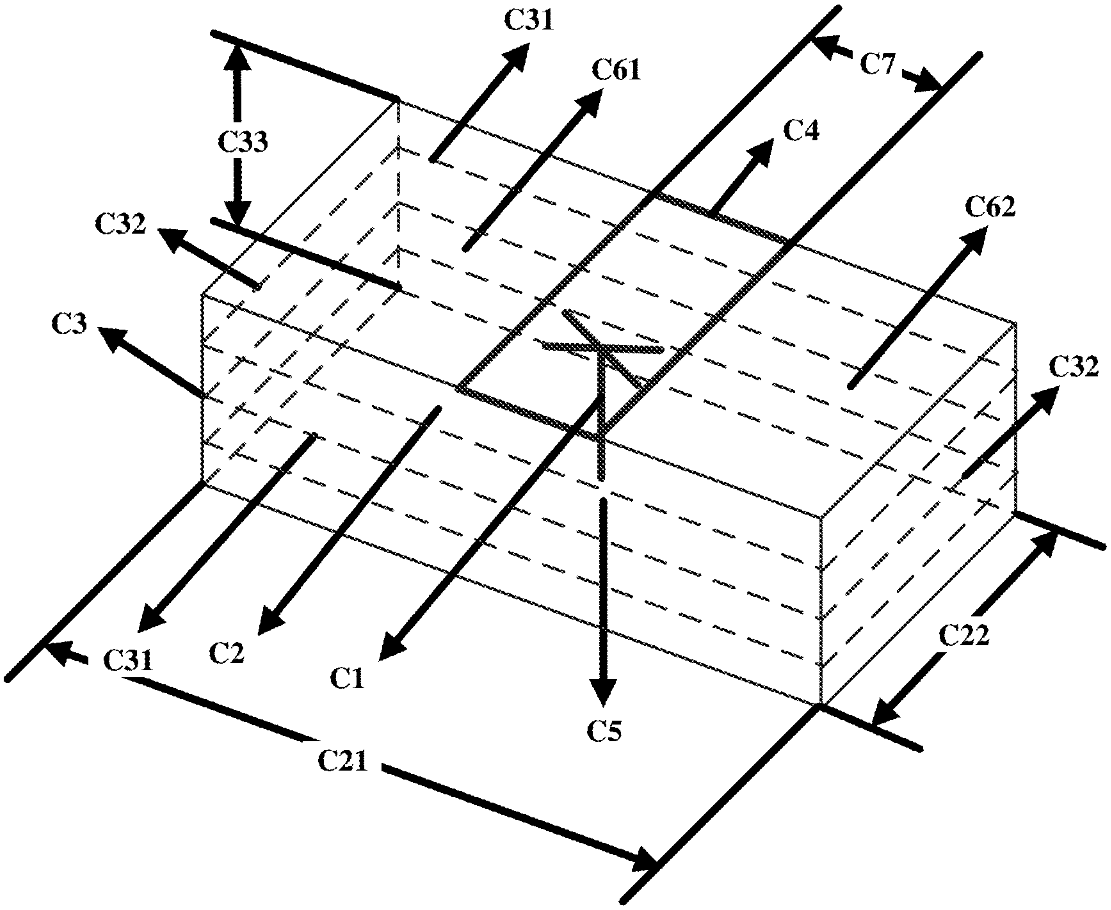
FIG. 3 is a schematic diagram of a structure of a cavity-backed antenna having a controllable beam width according to an embodiment of this application.

The following describes in detail a cavity-backed antenna having a controllable beam width according to an embodiment of this application. FIG. 3 is a schematic diagram of a structure of the cavity-backed antenna having a controllable beam width according to this embodiment of this application. As shown in the figure, C1 indicates a radiating element, C2 indicates a reflective baseplate, C3 indicates a metal enclosure frame, C4 indicates a first reflective surface, and C5 indicates a main radiation cavity. Therefore, the cavity-backed antenna having a controllable beam width includes the radiating element C1, the reflective baseplate C2, the metal enclosure frame C3, the first reflective surface C4, and the main radiation cavity C5. Further, C21 indicates long sides of the reflective baseplate, C22 indicates short sides of the reflective baseplate, C31 indicates first enclosure frame surfaces, C32 indicates second enclosure frame surfaces, C33 indicates a height of the metal enclosure frame C3, C61 and C62 indicate secondary radiation cavities, and C7 indicates an electrical connection region in which two ends of the first reflective surface C4 are correspondingly electrically connected to the two first enclosure frame surfaces C31 of the metal enclosure frame C3.

Specifically, the radiating element C1 is disposed on the reflective baseplate C2 and is located below the first reflective surface C4. The reflective baseplate C2 is rectangular. A reflective baseplate length of the reflective baseplate C2 is a length of the long side C21 of the reflective baseplate C2, and a reflective baseplate width of the reflective baseplate C2 is a length of the short side C22 of the reflective baseplate C2. Therefore, the reflective baseplate length of the reflective baseplate C2 should be greater than the reflective baseplate width of the reflective baseplate C2.

Specifically, a distance between a center point of the radiating element C1 and a center point of the reflective baseplate C2 ranges from 0 wavelengths to 0.1 wavelengths. All wavelengths described in this embodiment of this application are wavelengths corresponding to a center frequency in an operating frequency band.

Optionally, the radiating element may be a radiating element in any form. The radiating element in any form includes but is not limited to a patch, a symmetric element, a slot, and the like. Alternatively, the radiating element may be a radiating element in any polarization state. The radiating element in any polarization state includes but is not limited to 0° linear polarization, 90° linear polarization, ±45° dual polarization, circular polarization, and the like. This is not specifically limited herein.

Further, the metal enclosure frame C3 includes four enclosure frame surfaces, and the four enclosure frame surfaces include the two first enclosure frame surfaces C31 and the two second enclosure frame surfaces C32. The metal enclosure frame C3 is electrically connected to the reflective baseplate C2 in an encircling manner. To be specific, the metal enclosure frame C3 is disposed around the reflective baseplate C2. The two first enclosure frame surfaces C31 are electrically connected to the long sides C21 of the reflective baseplate C2. The two second enclosure frame surfaces C32 are electrically connected to the short sides C22 of the reflective baseplate C2.

Optionally, an included angle between the metal enclosure frame C3 and the reflective baseplate C2 ranges from 45 degrees to 90 degrees.

Further, the two ends of the first reflective surface C4 are correspondingly electrically connected to the two first enclosure frame surfaces C31 of the metal enclosure frame C3. The first reflective surface C4 may be a secondary reflective surface, a partially reflective surface, or a secondary reflective surface and a partially reflective surface. In this embodiment, an example in which the first reflective surface is a secondary reflective surface or a partially reflective surface is used for description. However, this should not be construed as a limitation on this embodiment.

Specifically, a distance between the reflective baseplate C2 and the first reflective surface C4 ranges from 0.3 wavelengths to 0.6 wavelengths.

Specifically, because the first reflective surface C4 is the secondary reflective surface or the partially reflective surface, a height range corresponding to the height C33 of the metal enclosure frame C3 is 0.3 wavelengths to 0.7 wavelengths. In addition, when the first reflective surface C4 is the partially reflective surface, a reflection coefficient of the partially reflective surface ranges from 0.5 to 0.9.

Optionally, the secondary reflective surface or the partially reflective surface may be rectangular, the secondary reflective surface or the partially reflective surface is circular, or the secondary reflective surface or the partially reflective surface is in an irregular shape with different widths. In this embodiment, a specific shape of the secondary reflective surface or the partially reflective surface is not limited. In addition, for ease of understanding, this embodiment is described by using an example in which the first reflective surface C4 is rectangular. However, this should not be construed as a limitation on this embodiment. Further, because the first reflective surface C4 in this embodiment is rectangular, a connection range of the electrical connection region C7 is 0 wavelengths to 0.6 wavelengths.

Specifically, a length of the reflective baseplate ranges from 1.2 wavelengths to 2 wavelengths, and a width of the reflective baseplate ranges from 0.4 wavelengths to 0.9 wavelengths. To be specific, the length of the long side C21 of the reflective baseplate C2 ranges from 1.2 wavelengths to 2 wavelengths, and the length of the short side C22 of the reflective baseplate C2 ranges from 0.4 wavelengths to 0.9 wavelengths.

Therefore, it can be learned from the foregoing description that the reflective baseplate C2 and the metal enclosure frame C3 may form the main radiation cavity C5, and the main radiation cavity C5 is divided into a plurality of secondary radiation cavities by the first reflective surface C4. In this embodiment of this application, the main radiation cavity C5 is divided into two secondary radiation cavities by the first reflective surface C4, and the two secondary radiation cavities are the secondary radiation cavity C61 and the secondary radiation cavity C62.

In this embodiment of this application, because the reflective baseplate C2 is in a rectangular asymmetric design, and the reflective baseplate and the metal enclosure frame form the main radiation cavity, the main radiation cavity C5 of the antenna is not of a symmetric structure. Therefore, a horizontal beam width and a vertical beam width are different. Through such an asymmetric design, a beam width of a horizontal plane and a beam width of a vertical plane may be separately controlled in a polarization state. In addition, the asymmetric main radiation cavity is divided into the plurality of secondary radiation cavities by the first reflective surface, so that an electric field can be evenly distributed, thereby improving an antenna gain.

In addition, because the included angle between the metal enclosure frame and the reflective baseplate ranges from 45 degrees to 90 degrees, and the included angle between the metal enclosure frame and the reflective baseplate in the embodiment shown in FIG. 3 is 90 degrees, for further understanding of this solution, the following describes in detail a case in which the included angle between the metal enclosure frame and the reflective baseplate in the cavity-backed antenna having a controllable beam width provided in this embodiment of this application is not equal to 90 degrees and the first reflective surface is a secondary reflective surface or a partially reflective surface.

Figure 4:
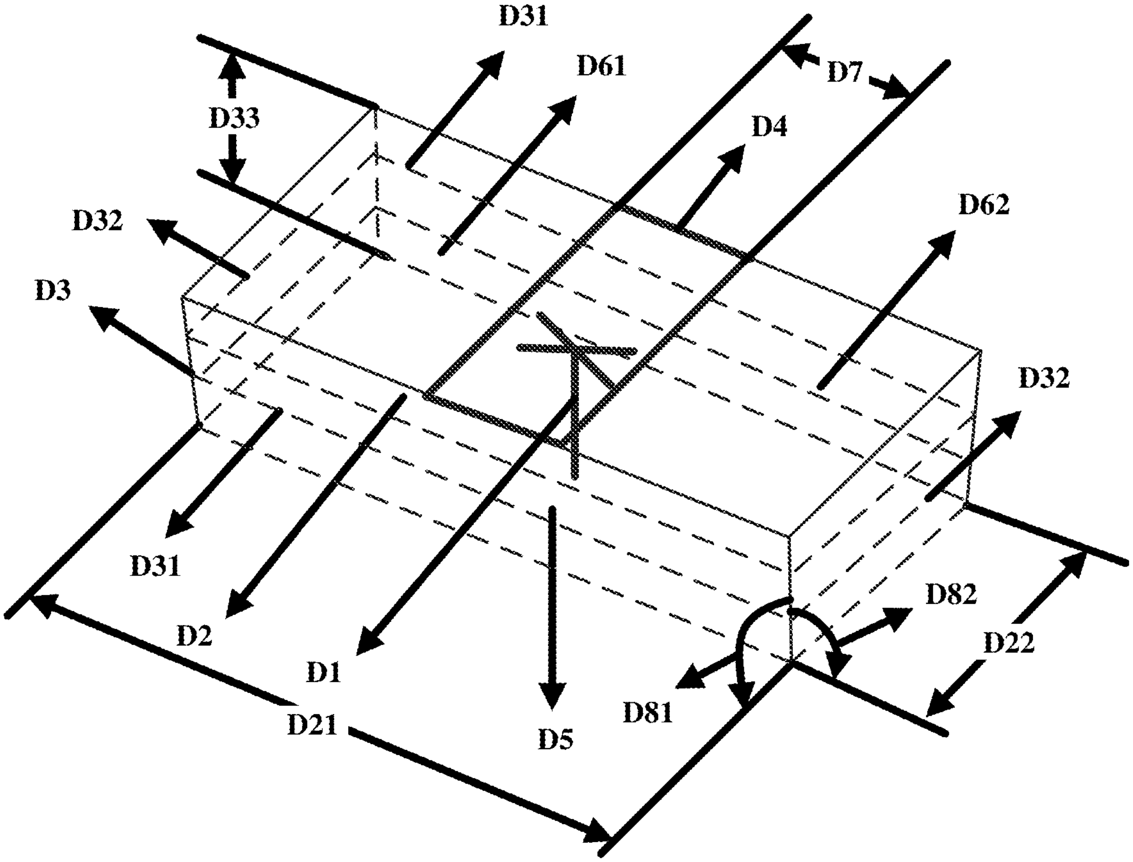
FIG. 4 is a schematic diagram of another structure of a cavity-backed antenna having a controllable beam width according to an embodiment of this application.

FIG. 4 is a schematic diagram of another structure of a cavity-backed antenna having a controllable beam width according to an embodiment of this application. As shown in the figure, D1 indicates a radiating element, D2 indicates a reflective baseplate, D3 indicates a metal enclosure frame, D4 indicates a first reflective surface, and D5 indicates a main radiation cavity. Therefore, the cavity-backed antenna having a controllable beam width includes the radiating element D1, the reflective baseplate D2, the metal enclosure frame D3, the first reflective surface D4, and the main radiation cavity D5. Further, D21 indicates long sides of the reflective baseplate, D22 indicates short sides of the reflective baseplate, D31 indicates first enclosure frame surfaces, D32 indicates second enclosure frame surfaces, D33 indicates a height of the metal enclosure frame D3, D61 and D62 indicate secondary radiation cavities, and D7 indicates electrical connection regions in which two ends of the first reflective surface D4 are correspondingly electrically connected to the two first enclosure frame surfaces D31 of the metal enclosure frame D3, D81 indicates an included angle between the first enclosure frame surfaces D31 and the reflective baseplate D2, and D82 indicates an included angle between the second enclosure frame surfaces D32 and the reflective baseplate D2. In this embodiment, connection relationships among the radiating element D1, the reflective baseplate D2, the metal enclosure frame D3, and the first reflective surface D4 are similar to those in the embodiment described in FIG. 3, and details are not described herein again.

Optionally, because the metal enclosure frame D3 includes two first enclosure frame surfaces D31 and two second enclosure frame surfaces D32, included angles between the metal enclosure frame and the reflective baseplate D2 include the included angle D81 between the first enclosure frame surfaces D31 and the reflective baseplate D2, and the included angle D82 between the second enclosure frame surfaces D32 and the reflective baseplate D2. The included angle D81 and the included angle D82 may be the same or different. However, the included angle D81 and the included angle D82 are both within a range of values greater than or equal to 45 degrees and less than 90 degrees, and specific values of the included angle D81 and the included angle D82 are not limited herein.

Specifically, a distance between a center point of the radiating element D1 and a center point of the reflective baseplate D2 ranges from 0 wavelengths to 0.1 wavelengths.

Specifically, a distance between the reflective baseplate D2 and the first reflective surface D4 ranges from 0.3 wavelengths to 0.6 wavelengths.

Optionally, the radiating element may be a radiating element in any form. The radiating element in any form includes but is not limited to a patch, a symmetric element, a slot, and the like. Alternatively, the radiating element may be a radiating element in any polarization state. The radiating element in any polarization state includes but is not limited to 0° linear polarization, 90° linear polarization, ±45° dual polarization, circular polarization, and the like. This is not specifically limited herein.

Specifically, because the first reflective surface D4 is a secondary reflective surface or a partially reflective surface, a height range corresponding to the height D33 of the metal enclosure frame D3 is 0.3 wavelengths to 0.7 wavelengths. In addition, when the first reflective surface D4 is the partially reflective surface, a reflection coefficient of the partially reflective surface ranges from 0.5 to 0.9.

Optionally, the secondary reflective surface or the partially reflective surface may be rectangular, the secondary reflective surface or the partially reflective surface is circular, or the secondary reflective surface or the partially reflective surface is in an irregular shape with different widths. In this embodiment, a specific shape of the secondary reflective surface or the partially reflective surface is not limited. In addition, for ease of understanding, this embodiment is described by using an example in which the first reflective surface D4 is rectangular. However, this should not be construed as a limitation on this embodiment. Further, because the first reflective surface D4 in this embodiment is rectangular, a connection range of the electrical connection region D7 is 0 wavelengths to 0.6 wavelengths.

Specifically, a length of the reflective baseplate ranges from 1.2 wavelengths to 2 wavelengths, and a width of the reflective baseplate ranges from 0.4 wavelengths to 0.9 wavelengths. To be specific, a length of the long side D21 of the reflective baseplate D2 ranges from 1.2 wavelengths to 2 wavelengths, and a length of the short side D22 of the reflective baseplate D2 ranges from 0.4 wavelengths to 0.9 wavelengths.

In addition, because the secondary reflective surface or the partially reflective surface may be rectangular, the secondary reflective surface or the partially reflective surface is circular, or the secondary reflective surface or the partially reflective surface is in an irregular shape with different widths. In this embodiment, a specific shape of the secondary reflective surface or the partially reflective surface is not limited. However, the embodiments shown in FIG. 3 and FIG. 4 describe a case in which the secondary reflective surface or the partially reflective surface is rectangular. For further understanding of this solution, the following describes in detail a case in which the secondary reflective surface or the partially reflective surface is not rectangular in embodiments of this application.

Figure 5:
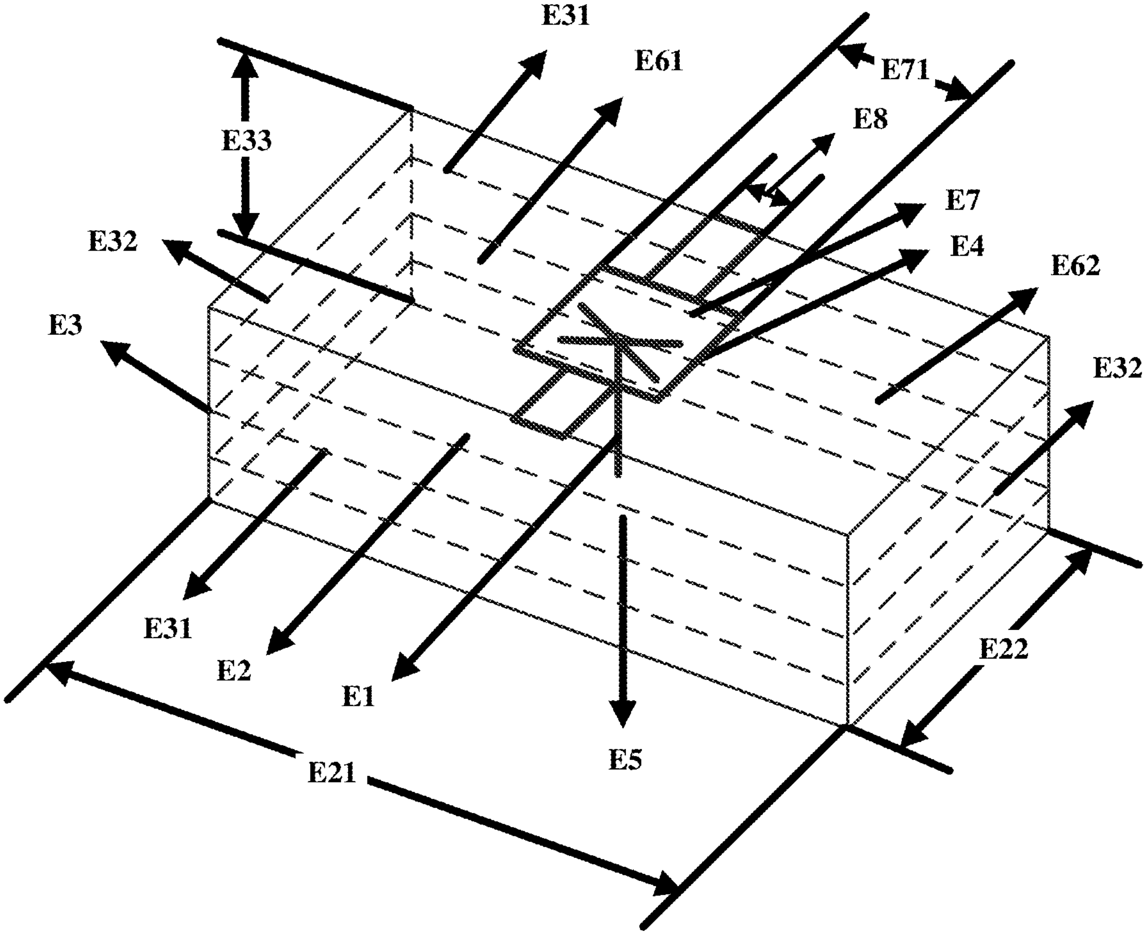
FIG. 5 is a schematic diagram of another structure of a cavity-backed antenna having a controllable beam width according to an embodiment of this application.

FIG. 5 is a schematic diagram of another structure of a cavity-backed antenna having a controllable beam width according to an embodiment of this application. As shown in the figure, E1 indicates a radiating element, E2 indicates a reflective baseplate, E3 indicates a metal enclosure frame, E4 indicates a first reflective surface, and E5 indicates a main radiation cavity. Therefore, the cavity-backed antenna having a controllable beam width includes the radiating element E1, the reflective baseplate E2, the metal enclosure frame E3, the first reflective surface E4, and the main radiation cavity E5. Further, E21 indicates long sides of the reflective baseplate, E22 indicates short sides of the reflective baseplate, E31 indicates first enclosure frame surfaces, E32 indicates second enclosure frame surfaces, E33 indicates a height of the metal enclosure frame E3, E61 and E62 indicate secondary radiation cavities, E7 indicates a central region, E71 indicates wide sides of the central region E7, where the central region E7 is located right above the radiating element E1, and E8 indicates electrical connection regions in which two ends of the first reflective surface E4 are correspondingly electrically connected to the two first enclosure frame surfaces E31 of the metal enclosure frame E3. In this embodiment, connection relationships among the radiating element E1, the reflective baseplate E2, the metal enclosure frame E3, and the first reflective surface E4 are similar to those in the embodiment described in FIG. 3, and details are not described herein again.

Specifically, in this embodiment, the first reflective surface E4 is a secondary reflective surface or a partially reflective surface, and the secondary reflective surface or the partially reflective surface is not rectangular. Therefore, the first reflective surface E4 includes the central region E7, and the central region E7 is located in a region above the radiating element E1. An offset between the region above the radiating element and a center point of the radiating element E1 is 0 wavelengths to 0.1 wavelengths, and a value range (width range) of the wide sides E71 of the central region E7 is 0.1 wavelengths to 0.6 wavelengths. In addition, a connection range of the electrical connection regions E8 is greater than 0 wavelengths and less than or equal to 0.6 wavelengths.

Specifically, a distance between the center point of the radiating element E1 and a center point of the reflective baseplate E2 ranges from 0 wavelengths to 0.1 wavelengths. All wavelengths described in this embodiment of this application are wavelengths corresponding to a center frequency in an operating frequency band.

Specifically, a distance between the reflective baseplate E2 and the first reflective surface E4 ranges from 0.3 wavelengths to 0.6 wavelengths.

Optionally, the radiating element may be a radiating element in any form. The radiating element in any form includes but is not limited to a patch, a symmetric element, a slot, and the like. Alternatively, the radiating element may be a radiating element in any polarization state. The radiating element in any polarization state includes but is not limited to 0° linear polarization, 90° linear polarization, ±45° dual polarization, circular polarization, and the like. This is not specifically limited herein.

Optionally, an included angle between the metal enclosure frame and the reflective baseplate ranges from 45 degrees to 90 degrees. In addition, a case in which an included angle between the metal enclosure frame and the reflective baseplate is 90 degrees is similar to that in the embodiment shown in FIG. 3, and a case in which an included angle between the metal enclosure frame and the reflective baseplate is not 90 degrees is similar to that in the embodiment shown in FIG. 4. Details of either case are not described herein.

Specifically, because the first reflective surface is the secondary reflective surface or the partially reflective surface, a height range corresponding to the height E33 of the metal enclosure frame E3 is 0.3 wavelengths to 0.7 wavelengths. In addition, when the first reflective surface is the partially reflective surface, a reflection coefficient of the partially reflective surface ranges from 0.5 to 0.9.

Specifically, a length of the reflective baseplate ranges from 1.2 wavelengths to 2 wavelengths, and a width of the reflective baseplate ranges from 0.4 wavelengths to 0.9 wavelengths. To be specific, a length of the long side E21 of the reflective baseplate E2 ranges from 1.2 wavelengths to 2 wavelengths, and a length of the short side E22 of the reflective baseplate E2 ranges from 0.4 wavelengths to 0.9 wavelengths.

Further, in the foregoing embodiment, a plurality of cases in which the first reflective surface is a secondary reflective surface or a partially reflective surface are described. For further understanding of this solution, the following describes in detail a case in which the first reflective surface is a secondary reflective surface and a partially reflective surface in this embodiment of this application. It should be understood that this embodiment is described by using an example in which the included angle between the metal enclosure frame and the reflective baseplate is 90 degrees and the first reflective surface is rectangular. In practical application, there is a case in which the included angle between the metal enclosure frame and the reflective baseplate is not 90 degrees and the first reflective surface is not rectangular, and a specific implementation is similar to that in the embodiments shown in FIG. 4 and FIG. 5, and therefore is not described again.

Figure 6:
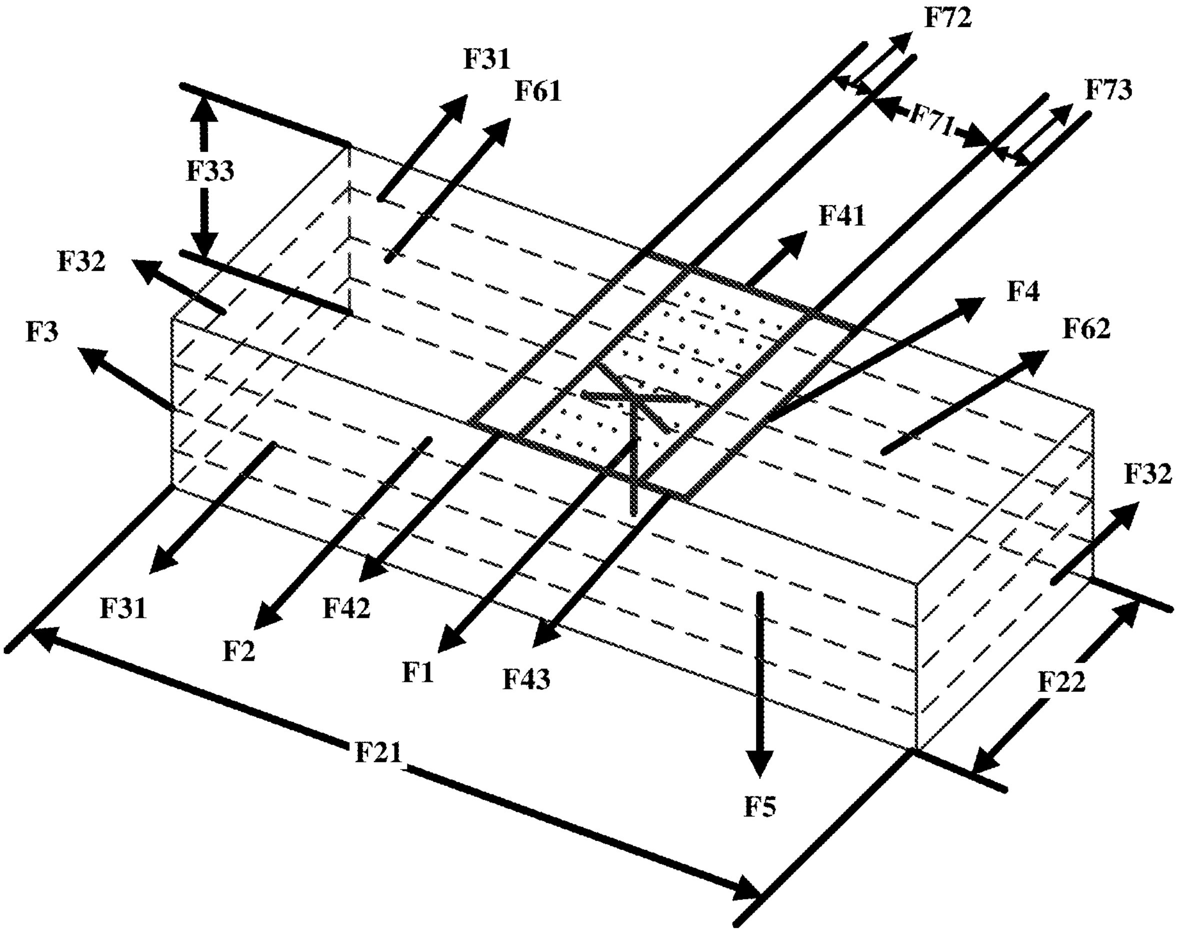
FIG. 6 is a schematic diagram of another structure of a cavity-backed antenna having a controllable beam width according to an embodiment of this application.

FIG. 6 is a schematic diagram of another structure of a cavity-backed antenna having a controllable beam width according to an embodiment of this application. As shown in the figure, F1 indicates a radiating element, F2 indicates a reflective baseplate, F3 indicates a metal enclosure frame, F4 indicates a first reflective surface, and F5 indicates a main radiation cavity. Therefore, the cavity-backed antenna having a controllable beam width includes the radiating element F1, the reflective baseplate F2, the metal enclosure frame F3, the first reflective surface F4, and the main radiation cavity F5. Further, F21 indicates long sides of the reflective baseplate, F22 indicates short sides of the reflective baseplate, F31 indicates first enclosure frame surfaces, F32 indicates second enclosure frame surfaces, and F33 indicates a height of the metal enclosure frame F3. Because the first reflective surface F4 is a secondary reflective surface and a partially reflective surface, F41 indicates a partially reflective surface, F42 and F43 indicate secondary reflective surfaces, F61 and F62 indicate secondary radiation cavities, F71 indicates electrical connection regions in which two ends of the partially reflective surface F41 are correspondingly electrically connected to the two first enclosure frame surfaces F31 of the metal enclosure frame F3, F72 indicates electrical connection regions in which two ends of the secondary reflective surface F42 are correspondingly electrically connected to the two first enclosure frame surfaces F31 of the metal enclosure frame F3, and F73 indicates electrical connection regions in which two ends of the secondary reflective surface F43 are correspondingly electrically connected to the two first enclosure frame surfaces F31 of the metal enclosure frame F3.

Specifically, a reflection coefficient of the partially reflective surface F41 ranges from 0.5 to 0.9. The partially reflective surface F41 is electrically connected to the secondary reflective surface F42, and the partially reflective surface F41 is electrically connected to the secondary reflective surface F43. The secondary reflective surface F42 and the secondary reflective surface F43 are not connected.

In addition, the radiating element F1 is disposed on the reflective baseplate F2 and is located below the first reflective surface F4 formed by the partially reflective surface F41, the secondary reflective surface F42, and the secondary reflective surface F43. The reflective baseplate F2 is rectangular. A reflective baseplate length of the reflective baseplate F2 is a length of the long side F21 of the reflective baseplate F2, and a reflective baseplate width of the reflective baseplate F2 is a length of the short side F22 of the reflective baseplate F2. Therefore, the reflective baseplate length of the reflective baseplate F2 should be greater than the reflective baseplate width of the reflective baseplate F2.

Specifically, a distance between a center point of the radiating element F1 and a center point of the reflective baseplate F2 ranges from 0 wavelengths to 0.1 wavelengths. All wavelengths described in this embodiment of this application are wavelengths corresponding to a center frequency in an operating frequency band.

Optionally, the radiating element may be a radiating element in any form. The radiating element in any form includes but is not limited to a patch, a symmetric element, a slot, and the like. Alternatively, the radiating element may be a radiating element in any polarization state. The radiating element in any polarization state includes but is not limited to 0° linear polarization, 90° linear polarization, ±45° dual polarization, circular polarization, and the like. This is not specifically limited herein.

Further, the metal enclosure frame F3 includes four enclosure frame surfaces, and the four enclosure frame surfaces include two first enclosure frame surfaces F31 and two second enclosure frame surfaces F32. The metal enclosure frame F3 is electrically connected to the reflective baseplate F2 in an encircling manner, that is, the metal enclosure frame F3 is disposed around the reflective baseplate F2. The two first enclosure frame surfaces F31 are electrically connected to the long sides F21 of the reflective baseplate F2, and the two second enclosure frame surfaces F32 are electrically connected to the short sides F22 of the reflective baseplate F2.

Optionally, an included angle between the metal enclosure frame F3 and the reflective baseplate F2 ranges from 45 degrees to 90 degrees. A case in which an included angle between the metal enclosure frame and the reflective baseplate is 90 degrees is similar to that in the embodiment shown in FIG. 3. A case in which an included angle between the metal enclosure frame and the reflective baseplate is not 90 degrees is similar to that in the embodiment shown in FIG. 4. Details of either case are not described herein.

Specifically, a distance between the reflective baseplate F2 and the first reflective surface F4 ranges from 0.3 wavelengths to 0.6 wavelengths.

Specifically, because the first reflective surface F4 is the secondary reflective surface and the partially reflective surface, a height range corresponding to the height F33 of the metal enclosure frame F3 is 0.3 wavelengths to 0.7 wavelengths.

Optionally, the secondary reflective surface and the partially reflective surface may be rectangular, the secondary reflective surface or the partially reflective surface is circular, or the secondary reflective surface or the partially reflective surface is in an irregular shape with different widths. In this embodiment, a specific shape of the secondary reflective surface or the partially reflective surface is not limited. For ease of understanding, this embodiment is described by using an example in which the secondary reflective surface and the partially reflective surface are rectangular. However, this should not be construed as a limitation on this embodiment. When the secondary reflective surface and the partially reflective surface are not rectangular, a specific implementation is similar to that described in the embodiment in FIG. 5. Further, because the secondary reflective surface and the partially reflective surface in this embodiment are rectangular, a connection range of the electrical connection regions F71 is 0.4 wavelengths to 0.7 wavelengths, a connection range of the electrical connection regions F72 is greater than 0 wavelengths and less than or equal to 0.25 wavelengths, a connection range of the electrical connection regions F73 is greater than 0 wavelengths and less than or equal to 0.25 wavelengths, and connection lengths of the electrical connection regions F72 and the electrical connection regions F73 may be the same or different. This is not limited herein.

Specifically, a length of the reflective baseplate ranges from 1.5 wavelengths to 2 wavelengths, and a width of the reflective baseplate ranges from 0.4 wavelengths to 0.9 wavelengths. To be specific, the length of the long side F21 of the reflective baseplate F2 ranges from 1.5 wavelengths to 2 wavelengths, and the length of the short side F22 of the reflective baseplate F2 ranges from 0.4 wavelengths to 0.9 wavelengths.

It should be understood that the examples in FIG. 3 to FIG. 6 are provided merely for helping a person skilled in the art understand embodiments of this application, instead of limiting embodiments of this application to specific scenarios shown in the examples. A person skilled in the art may apparently make various equivalent modifications or changes according to the examples shown in FIG. 3 to FIG. 6, and such modifications or changes also fall within the scope of embodiments of this application.

It should be further understood that the solutions in embodiments of this application may be appropriately combined for use, and explanations or descriptions of terms in the embodiments may be mutually referenced or explained in the embodiments. This is not limited.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The foregoing integrated unit may be implemented in a form of hardware, or may be implemented in a form of a software functional unit.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An antenna, comprising:

a radiating element, a reflective baseplate, a metal enclosure frame, a first reflective surface, and a radiation cavity, wherein the radiating element is disposed on the reflective baseplate and is located below the first reflective surface;

the reflective baseplate is rectangular, wherein a reflective baseplate length of the reflective baseplate is greater than a reflective baseplate width of the reflective baseplate;

the metal enclosure frame is connected to the reflective baseplate, and the metal enclosure frame encircles the reflective baseplate, and the metal enclosure frame comprises:

four enclosure frame surfaces, wherein the four enclosure frame surfaces comprise:

two first enclosure frame surfaces, and two second enclosure frame surfaces, the first enclosure frame surfaces of the two first enclosure frame surfaces are electrically connected to first sides of the reflective baseplate, and the second enclosure frame surfaces of the two second enclosure frame surfaces are electrically connected to second sides of the reflective baseplate, the first sides of the reflective baseplate being greater in length than the second sides of the reflective baseplate;

two ends of the first reflective surface are correspondingly electrically connected to the two first enclosure frame surfaces of the metal enclosure frame, wherein the first reflective surface includes two secondary reflective surfaces and a partially reflective surface;

the radiation cavity includes the reflective baseplate and the metal enclosure frame; and the radiation cavity is divided into a plurality of secondary radiation cavities by the first reflective surface.

2. The antenna according to claim 1, wherein a distance between a center point of the radiating element and a center point of the reflective baseplate ranges from 0 wavelengths to 0.1 wavelengths, and a wavelength of the wavelengths corresponds to a center frequency of an operating frequency band.

3. The antenna according to claim 1, wherein a distance between the reflective baseplate and the first reflective surface ranges from 0.3 wavelengths to 0.6 wavelengths, and a wavelength of the wavelengths corresponds to a center frequency of an operating frequency band.

4. The antenna according to claim 1, wherein an included angle between the metal enclosure frame and the reflective baseplate ranges from 45 degrees to 90 degrees.

5. The antenna according to claim 1, wherein a reflection coefficient of the partially reflective surface ranges from 0.5 to 0.9;

a height of the metal enclosure frame ranges from 0.3 wavelengths to 0.7 wavelengths, and a wavelength of the wavelengths corresponds to a center frequency of an operating frequency band.

6. The antenna according to claim 5, wherein a width of a central region of at least one of the secondary reflective surface or the partially reflective surface ranges from 0.1 wavelengths to 0.6 wavelengths, the central region is located above the radiating element, and an offset between the central region and a center point of the radiating element ranges from 0 wavelengths to 0.1 wavelengths; and a connection range of electrical connection regions in which two ends of the secondary reflective surface or two ends of the partially reflective surface are correspondingly electrically connected to the two first enclosure frame surfaces of the metal enclosure frame, and is greater than 0 wavelengths and less than or equal to 0.6 wavelengths.

7. The antenna according to claim 5, wherein the reflective baseplate length of the reflective baseplate ranges from 1.2 wavelengths to 2 wavelengths, the reflective baseplate width of the reflective baseplate ranges from 0.4 wavelengths to 0.9 wavelengths.

8. The antenna according to claim 1, wherein a reflection coefficient of the partially reflective surface ranges from 0.5 to 0.9;

the partially reflective surface is electrically connected to each of the two secondary reflective surfaces, and the two secondary reflective surfaces are not connected to each other, and a wavelength of the wavelengths corresponds to a center frequency of an operating frequency band.

9. The antenna according to claim 8, wherein a height of the metal enclosure frame ranges from 0.3 wavelengths to 0.7 wavelengths.

10. The antenna according to claim 8, wherein a connection range of electrical connection regions in which the partially reflective surface is electrically connected to the two first enclosure frame surfaces of the metal enclosure frame, and ranges from 0.4 wavelengths to 0.7 wavelengths; and a connection range of electrical connection regions in which the secondary reflective surface is electrically connected to the two first enclosure frame surfaces of the metal enclosure frame, and is greater than 0 wavelengths and less than or equal to 0.25 wavelengths.

11. The antenna according to claim 8, wherein the reflective baseplate length of the reflective baseplate ranges from 1.5 wavelengths to 2 wavelengths, and the reflective baseplate width of the reflective baseplate ranges from 0.4 wavelengths to 0.9 wavelengths.

12. A base station, comprising:

antenna adjustment supports, a pole and a cavity-backed antenna;

the cavity-backed antenna is connected to the pole by the antenna adjustment supports, and the cavity-backed antenna comprises:

a radiating element, a reflective baseplate, a metal enclosure frame, a first reflective surface, and a radiation cavity, wherein the cavity-backed antenna has a controllable beam width, wherein the radiating element is disposed on the reflective baseplate and is located below the first reflective surface;

the reflective baseplate is rectangular, wherein a reflective baseplate length of the reflective baseplate is greater than a reflective baseplate width of the reflective baseplate;

the metal enclosure frame is connected to the reflective baseplate, and the metal enclosure frame encircles the reflective baseplate, and the metal enclosure frame comprises:

four enclosure frame surfaces, wherein the four enclosure frame surfaces comprise:

two first enclosure frame surfaces, and two second enclosure frame surfaces, the first enclosure frame surfaces of the two first enclosure frame surfaces are electrically connected to first sides of the reflective baseplate, and the second enclosure frame surfaces of the two second enclosure frame surfaces are electrically connected to second sides of the reflective baseplate, the first sides of the reflective baseplate being greater in length than the second sides of the reflective baseplate;

two ends of the first reflective surface are correspondingly electrically connected to the two first enclosure frame surfaces of the metal enclosure frame, wherein the first reflective surface includes two secondary reflective surfaces and a partially reflective surface;

the radiation cavity includes the reflective baseplate and the metal enclosure frame; and the radiation cavity is divided into a plurality of secondary radiation cavities by the first reflective surface.

13. The base station according to claim 12, wherein a distance between a center point of the radiating element and a center point of the reflective baseplate ranges from 0 wavelengths to 0.1 wavelengths, and a wavelength of the wavelengths corresponds to a center frequency of an operating frequency band.

14. The base station according to claim 12, wherein a distance between the reflective baseplate and the first reflective surface ranges from 0.3 wavelengths to 0.6 wavelengths, and a wavelength of the wavelengths corresponds to a center frequency of an operating frequency band.

15. The base station according to claim 12, wherein an included angle between the metal enclosure frame and the reflective baseplate ranges from 45 degrees to 90 degrees.

16. The base station according to claim 12, wherein a reflection coefficient of the partially reflective surface ranges from 0.5 to 0.9;

a height of the metal enclosure frame ranges from 0.3 wavelengths to 0.7 wavelengths, and a wavelength of the wavelengths corresponds to a center frequency of an operating frequency band.

17. The base station according to claim 16, wherein a width of a central region of at least one of the secondary reflective surface or the partially reflective surface ranges from 0.1 wavelengths to 0.6 wavelengths, the central region is located above the radiating element, and an offset between the central region and a center point of the radiating element ranges from 0 wavelengths to 0.1 wavelengths; and a connection range of electrical connection regions in which two ends of the secondary reflective surface or two ends of the partially reflective surface are correspondingly electrically connected to the two first enclosure frame surfaces of the metal enclosure frame, and is greater than 0 wavelengths and less than or equal to 0.6 wavelengths.

18. The base station according to claim 17, wherein the reflective baseplate length of the reflective baseplate ranges from 1.2 wavelengths to 2 wavelengths, the reflective baseplate width of the reflective baseplate ranges from 0.4 wavelengths to 0.9 wavelengths.

19. The base station according to claim 12, wherein a reflection coefficient of the partially reflective surface ranges from 0.5 to 0.9;

the partially reflective surface is electrically connected to each of the two secondary reflective surfaces, and the two secondary reflective surfaces are not connected to each other, and a wavelength of the wavelengths corresponds to a center frequency of an operating frequency band.

20. The base station according to claim 19, wherein a height of the metal enclosure frame ranges from 0.3 wavelengths to 0.7 wavelengths.

* * * * *